(12) United States Patent
Lee et al.

(10) Patent No.: US 8,213,770 B2
(45) Date of Patent: Jul. 3, 2012

(54) APPARATUS AND METHOD FOR STORING DIGITAL BROADCAST DATA

(75) Inventors: Young-Sik Lee, Suwon-si (KR); Dong-Jun Kum, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1127 days.

(21) Appl. No.: 11/831,563

(22) Filed: Jul. 31, 2007

(65) Prior Publication Data

US 2008/0002944 A1    Jan. 3, 2008

(30) Foreign Application Priority Data

Aug. 1, 2006   (KR) .................. 10-2006-0072525

(51) Int. Cl.
  *H04N 5/94* (2006.01)
  *H04N 9/88* (2006.01)

(52) U.S. Cl. .................. 386/263; 386/264; 386/270

(58) Field of Classification Search .......... 386/263–277, 386/291–299
See application file for complete search history.

(56) References Cited

U.S. PATENT DOCUMENTS

| | | | | |
|---|---|---|---|---|
| 6,745,016 | B2 * | 6/2004 | Iwata et al. | 455/234.1 |
| 7,096,481 | B1 * | 8/2006 | Forecast et al. | 725/32 |
| 7,212,252 | B2 * | 5/2007 | Kuznetsov et al. | 348/734 |
| 2004/0018850 | A1 * | 1/2004 | Ishiguro et al. | 455/522 |
| 2006/0008243 | A1 * | 1/2006 | Przybylek | 386/46 |
| 2006/0083315 | A1 * | 4/2006 | Sato et al. | 375/240.25 |

FOREIGN PATENT DOCUMENTS

| | | |
|---|---|---|
| KR | 1020010050828 | 6/2001 |
| KR | 1020050060151 | 6/2005 |
| KR | 1020060068351 | 6/2006 |
| KR | 1020060129654 | 12/2006 |

* cited by examiner

*Primary Examiner* — Thai Tran
*Assistant Examiner* — Hung Dang
(74) *Attorney, Agent, or Firm* — The Farrell Law Firm, P.C.

(57) ABSTRACT

An apparatus and method for storing digital broadcast data in a digital broadcast receiving terminal. If the digital broadcast receiving terminal enters a weak electric field strength region during reception of digital broadcast data, digital broadcast receiving terminal stops the process of receiving the digital broadcast data so as to check whether digital broadcast receiving terminal re-enters again into the strong electric field strength region. Then, if the digital broadcast receiving terminal re-enters the strong electric field region, the terminal shifts a TS value of a received digital broadcast data frame to the value obtained by adding a frame interval of the digital broadcast data frames to the TS value of the previous data frame that had been completely stored just before the digital broadcast receiving terminal entered the weak electric field strength region. Thus, the invention enables the digital broadcast receiving terminal to drop the digital broadcast data frames received during the weak electric field strength intervals so that it may smoothly and continuously play back the digital broadcast data frames received only during the strong electric field strength intervals.

13 Claims, 5 Drawing Sheets

APPARATUS AND METHOD FOR STORING DIGITAL BROADCAST DATA

PRIORITY

This application claims priority under 35 U.S.C. §119(a) to a Korean Patent Application entitled "Apparatus and Method for Storing Digital Broadcast Data" filed in the Korean Intellectual Property Office on Aug. 1, 2006 and assigned Serial No. 2006-72525, the contents of which are incorporated herein by reference.

BACKGROUND OF THE INVENTION

1. Field of the Invention

The present invention relates to a digital broadcast receiving terminal, and in particular, to an apparatus and method for storing video and audio data frames when receiving digital broadcast signals.

2. Description of the Related Art

The digital broadcast technologies have been dramatically developed so as to enable the digital broadcast receiving terminal to store and play back particular digital broadcast content frame-by-frame according to a user's desired schedule, which is different from the conventional simple receiving function.

Generally, if the digital broadcast receiving terminal enters a weak electric field strength region where receiving digital broadcast data is difficult, the received video and audio data can not be used to reproduce complete audio/visual signals displayed on the screen until the terminal enters a strong electric field strength region. Hence, when the digital broadcast receiving terminal enters a weak electric field strength region, the digital broadcast receiving terminal stops receiving the digital broadcast data, and checks the digital broadcast data when the digital broadcast receiving terminal re-enters a strong electric field strength region once again.

Moreover, if the digital broadcast receiving terminal enters a weak electric field strength region even while storing digital broadcast data, it also stops the storing process together with the reception of the broadcast data. Unfortunately, when the terminal re-enters a strong electric field strength region again, the user must manually manipulate the terminal to restart the storing process.

In many cases, in order to make it unnecessary for the user to restart the storing operation, the digital broadcast receiving terminal may continue to receive the digital broadcast data, even in a weak electric field strength region. However, in this case, the faulty data received in the weak electric field strength region must be stored in digital broadcast receiving terminal's memory, resulting in unnecessary consumption of memory capacity. Further, the digital broadcast receiving terminal generally plays back the stored contents frame-by-frame according to the order of Time Stamp (TS). Hence, if the digital broadcast terminal does not stop the storing process while in a weak electric field strength region, even the faulty data frames stored in memory, while in the weak electric field strength region, must be played back before the normal data frames are stored once again when the digital broadcast receiving terminal re-enters the strong electric field strength region.

SUMMARY OF THE INVENTION

It is one aspect of the present invention to provide an apparatus and method for storing digital broadcast data so as to normally play back even without stopping the storing process if weak electric field strength regions are encountered.

It is another aspect of the present invention to provide an apparatus and method for storing digital broadcast data so as to be normally, continuously and smoothly played back by a digital broadcast receiving terminal if the digital broadcast receiving terminal encounters a weak electric field strength regions.

According to one aspect of the present invention, an apparatus for storing digital broadcast data in a digital broadcast receiving terminal includes a receiving state sensor for sensing the receiving state of the digital broadcast data; a digital broadcast receiver for receiving the digital broadcast data frame-by-frame; a memory part for storing at least one frame of the digital broadcast data, the Time Stamp (TS) value of the current data frame as the TS value of the data frame and the predetermined frame interval of the digital broadcast data; a TS extractor for extracting the TS value of the data frame completely stored; a TS shifter for adding the frame interval to the TS value of the data frame; and a control unit for enabling the digital broadcast receiving terminal to stop the storing process in a weak electric field strength region, select the current data frame completely received in a strong electric field strength region, shift the TS value of the selected data frame according to the addition of the TS shifter, store the selected data frame, and store the TS value of the current data frame completely stored as the TS frame of the data frame.

According to another aspect of the present invention, a method for storing digital broadcast data includes storing received digital broadcast data frame-by-frame; determining whether the current receiving state of the digital broadcast data indicates a weak electric field strength; storing a TS value of the data frame currently having been stored as the TS value of the data frame if the current receiving state indicates a weak electric field strength; stopping the storing process of the digital broadcast data; determining whether the current receiving state of the digital broadcast data recovers a strong electric field strength; selecting the data frame having been received just when the current receiving state has recovered the strong electric field strength; shifting the TS value of the selected data frame according to the TS value of the data frame and a predetermined frame interval; restarting the storing of the data frame with the shifted TS value; and replacing the TS value of the frame with the shifted TS value of the stored data frame.

BRIEF DESCRIPTION OF THE DRAWINGS

The above and other objects, features and advantages of the present invention will become more apparent from the following detailed description when taken in conjunction with the accompanying drawing in which.

DETAILED DESCRIPTION OF THE PREFERRED EMBODIMENTS

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

As further described below, if the digital broadcast receiving terminal enters a weak electric field strength region during the process of receiving digital broadcast data, it stops the process of receiving the digital broadcast data so as to check whether it enters a strong electric field strength region again. Then, upon entering a strong electric field region again, the terminal shifts the TS value of the received digital broadcast data frame to the value obtained by adding a predetermined frame interval of the digital broadcast data frames to the TS value of the previous data frame that had been completely stored just before entering the weak electric field strength region. Thus, the invention enables the terminal to drop the digital broadcast data frames received during the weak electric field strength intervals so that it may smoothly and continuously play back the digital broadcast data frames received only during the strong electric field strength intervals.

Figure 1:
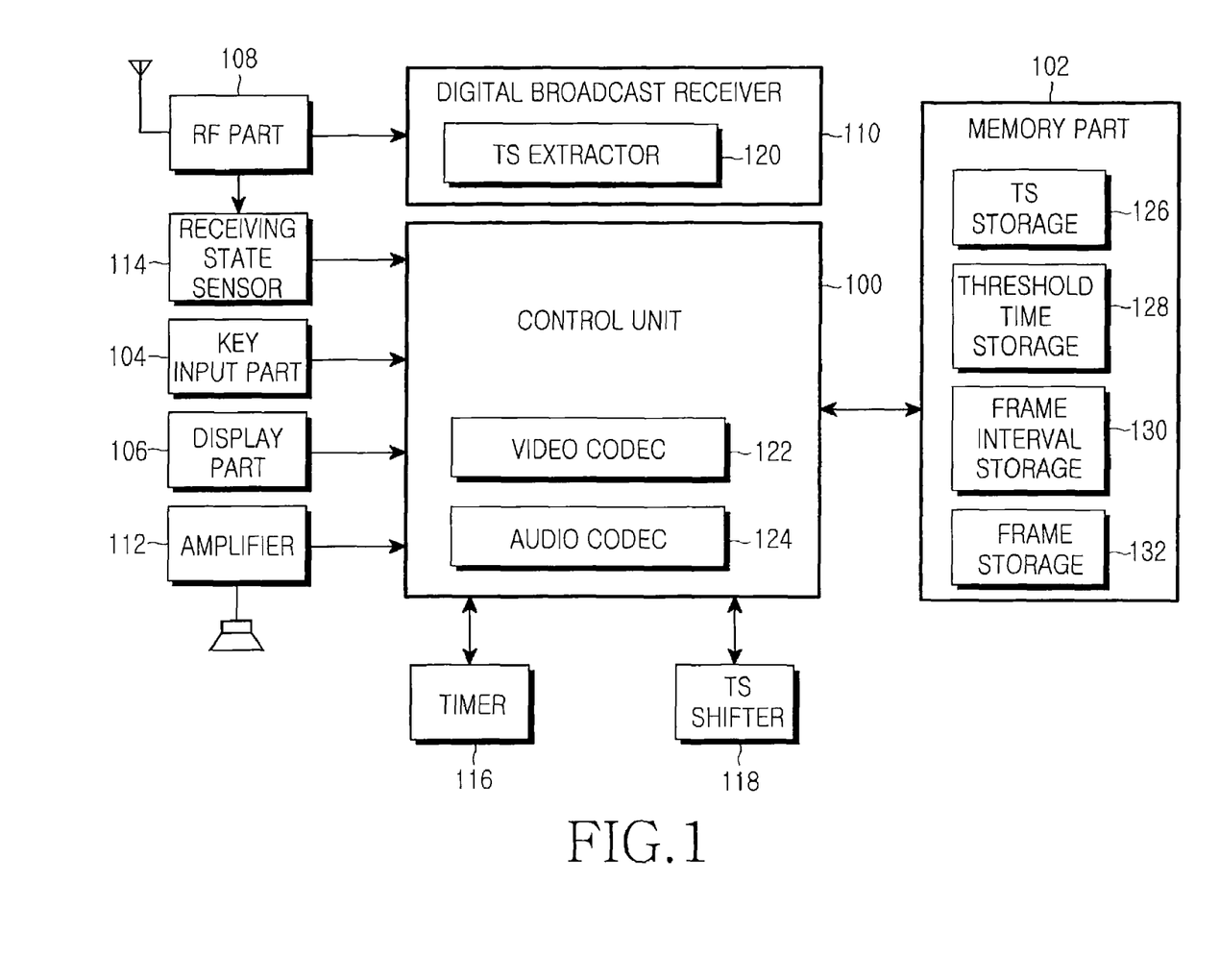
FIG. 1 is a block diagram for illustrating the structure of a digital broadcast receiving terminal according to an embodiment of the present invention.

In FIG. 1, the digital broadcast receiving terminal comprises a control unit 100, a memory part 102 connected to the control unit 100, a key input part 104, a display part 106, a digital broadcast receiver 110, an amplifier 112, a receiving state sensor 114, a timer 116, and a TS shifter 118. The control unit 100 processes audio/visual data according to a protocol for digital broadcast, controlling each part of the digital broadcast receiving terminal. The control unit further determines whether digital broadcast receiving terminal will or will not receive the digital broadcast data frames from the digital broadcast receiver 110 according to the output signal of the receiving state sensor 114. If the output signal of the receiving state sensor 114 indicates that the terminal is in a strong electric field strength region, the control unit 100 receives the digital broadcast data frames from the digital broadcast receiver 110. The received digital broadcast data are decoded by the video codec 122 and audio codec 124 and delivered to the display part 106 or amplifier 112. In addition, the control unit 100 enables the user to control the display part 106 by means of the key input part 104 so as to enjoy desired picture information. The control unit 100 also enables the user to store the digital broadcast data in the memory part 102.

However, if the receiving state sensor 114 signals that the digital broadcast receiving terminal is entering a weak electric field strength region, the control unit 100 stores the TS value of the digital broadcast data frame having been completely stored in the memory part 102 just before entering the weak electric field strength region. Then, the control unit 100 drops the digital broadcast data frames being received before the terminal enters again a strong electric field strength region by checking the receiving state sensor 114. Here, the control unit 100 may set a predetermined threshold time to serve as a reference for determining whether or not the terminal has entered a weak electric field strength region. If the phenomenon of detection of a weak electric field strength does not last over the threshold time, the control unit 100 ignores it as a temporary phenomenon and continues the process of storing the received data frames. In addition, the user may conveniently adjust the threshold time.

If the receiving state sensor 114 indicates that the terminal has re-entered a strong electric field strength region once more, the control unit 100 adds a predetermined frame interval of the digital broadcast data frames to the present TS value retrieved from the memory part 102, thereby shifting the TS value of the data frame having been completely received just after entering again the strong electric field strength region to the added value stored in the memory part 102. As a result, the TS value of the next digital broadcast data frame is shifted to the value obtained by adding the frame interval to the previously stored value.

In this case, the frame interval is determined by the number of digital broadcast data frames generated per second according to the characteristics of a digital broadcast system or digital broadcast content. For example, if the digital broadcast system generates 30 frames per second, the frame interval is 33 msec obtained by dividing 1 second by 30. In addition, for a digital broadcast system that generates 15 frames per second, the frame interval is 67 msec obtained by dividing 1 second by 15.

Hence, if the digital broadcast receiving terminal enters a strong electric field strength region again, the TS value of the data frame having been received just after entering the strong electric field strength region is shifted to the value obtained by adding the frame interval to the TS value of the data frame stored just before entering a weak electric field strength region, so that the digital broadcast data frames stored may be smoothly and continuously played back.

The memory part 102 connected with the control unit 100 comprises a ROM (Read Only Memory), a flash memory, and a RAM (Random Access Memory). The ROM serves to store the control programs for the control unit along with various reference data, the RAM as a working memory, and the flash memory to store various revisable preserved data.

Furthermore, the flash memory includes a frame storage 132 for preserving the digital broadcast data frames, a frame interval storage 130 for storing a predetermined frame interval, and a TS storage 126 for storing the TS value. The TS storage 126 is a region of the memory part 102 for storing the TS value of the digital broadcast data frame having been completely stored in order to shift the TS value of the digital broadcast data frames having been completely received just after entering again a strong electric field strength region. In addition, if the threshold time is used, the flash memory may include threshold time storage 128.

The key input part 104 is provided with various keys, including numeric keys, so as to enable the user to input key signals to the control unit 100. The display part 106 converts the decoded video data received from the control unit 100 into corresponding picture information. The amplifier 112 amplifies the decoded audio data received from the control unit 100, applying the output to the speaker. The speaker volume is controlled by the control unit 100.

The digital broadcast receiver 110 receives the digital broadcast data frames from a digital broadcast station through the RF part 108. A particular broadcast channel selected by the control unit 100 is set by the RF part 108 to receive desired multimedia broadcast data. According to one embodiment of the present invention, the digital broadcast receiver 110 includes the TS extractor 120 to extract the TS value of the digital broadcast data frame currently stored. The TS extractor 120 may be included separately from the digital broadcast receiver 110. The TS shifter 118 adds the frame interval to the TS value retrieved from the memory part 102 to transfer the added value to the control unit 100. The RF part 108 includes a baseband processor, receiving the digital broadcast data through a multimedia channel set by the user.

The receiving state sensor 114 checks the receiving state of the digital broadcast data frame received from the RF part 108 so as to notify the control unit 100 whether the digital broadcast receiving terminal is in weak or strong electric field strength region. In this case, the receiving state sensor 114 may determine whether the signal strength of the received digital broadcast data frame is weak or strong by comparing the signal strength with a predetermined threshold value, or by comparing the signal to noise ratio with a predetermined threshold value. Such a determination may be made by using both methods sequentially. If the signal strength exceeds a predetermined threshold value, then the signal to noise ratio is checked to exceed a predetermined threshold value. Additionally, a predetermined threshold time may be set so as to determine whether the phenomenon of a weak electric field strength lasts over the threshold time, which is checked by the timer 116.

Figure 2:
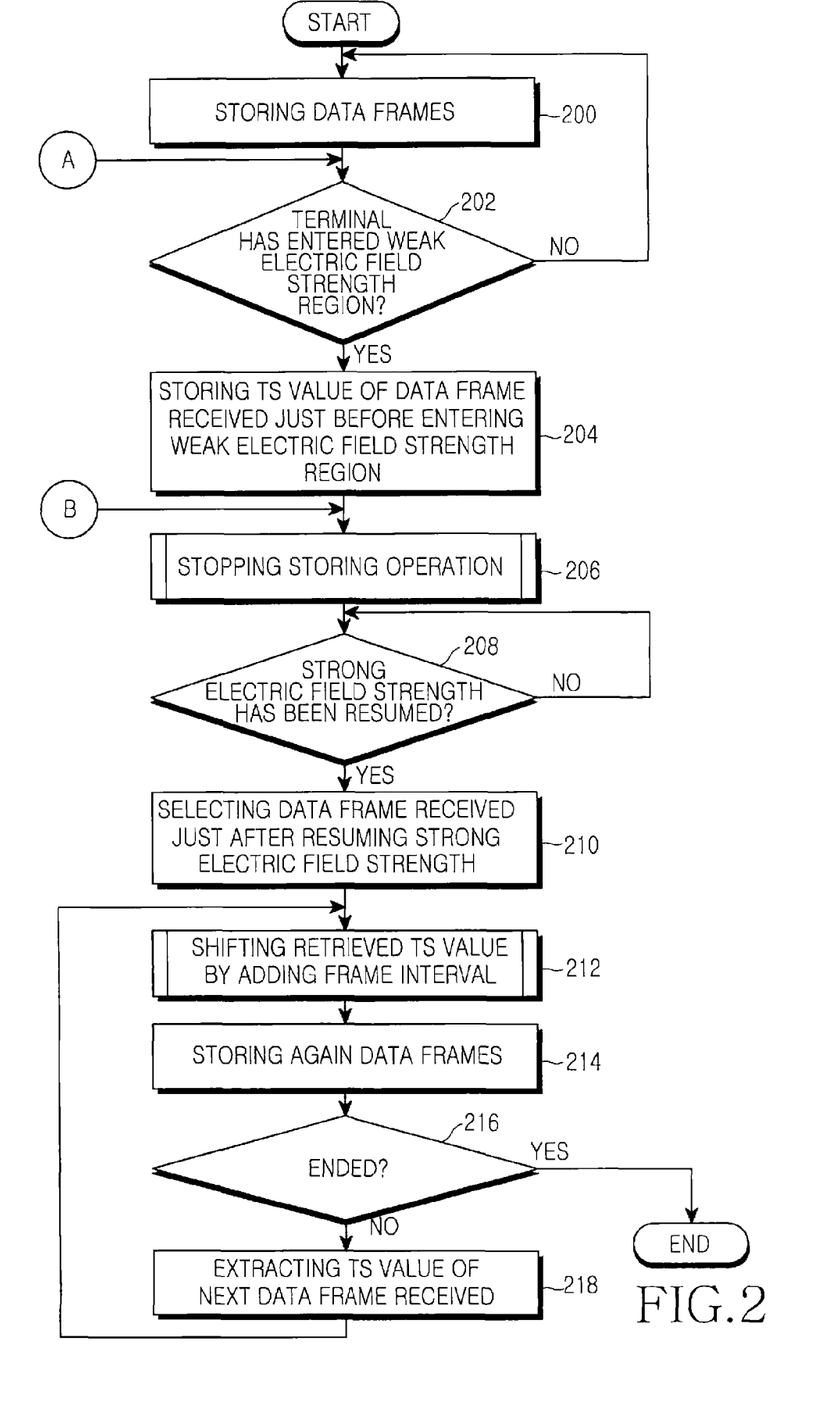
FIG. 2 is a flowchart for illustrating a process of storing audio/visual data frames according to an embodiment of the present invention.

FIG. 2 illustrates a process for storing audio/visual data frames, if the user elects to store the digital broadcast data, the control unit 100 goes to step 200 to store the digital broadcast data frames. Subsequently, step 202 checks whether the digital broadcast receiving terminal has entered a weak electric field strength region. If the receiving state is not in a weak electric field strength region, the control unit 100 continues storing the digital data frames continuously received. However, if the receiving state is in a weak electric field strength region, the control unit 100 goes to step 204 to store the TS value of the digital broadcast data frame received just before entering the weak electric field strength region in the TS storage 126 of the memory part 102. Then, the control unit 100 goes to step 206 to stop the operation of storing the data frames. In this case, the stopping of the storing operation in step 206 may be determined if a predetermined threshold time has elapsed. If, however, the threshold time has not elapsed, the control unit 100 regards it as a temporary phenomenon, and keeps on storing the data frames. The process of stopping the operation of storing the data frames is described below with reference to FIG. 3.

If the storing operation of the data frames is stopped in step 206, the control unit 100 goes to step 208 to determine whether the receiving state of the present digital broadcast data has resumed storing while in a strong electric field strength region. If the receiving state has resumed storing while in a strong electric field strength region, the control unit 100 goes to step 210 to select the first data frame received just after the digital broadcast terminal enters the strong electric field strength region. Then, the control unit 100 goes to step 212 to add the predetermined frame interval retrieved from the frame interval storage 130 to the TS value retrieved from the TS storage 126 so as to shift the TS value of the presently selected data frame to the added value newly stored in the TS storage 126. Thus, the TS value of the data frame received just after entering the strong electric field strength region is shifted by the frame interval in step 212 so as to make the data frame received just after entering the strong electric field strength region immediately follow the data frame stored just before entering the weak electric field strength region. The digital broadcast receiving terminal is then able to smoothly and continuously play back the data frames, even if a weak electric field strength interval occurs during the reception of the digital broadcast data frames. The step of shifting the TS value is described below with reference to FIG. 4.

Shifting the TS value of the first data frame received just after entering the strong electric field strength region, the control unit 100 goes to step 214 to store again the data frame with the shifted TS value in the frame storage 132 of the memory part 102. The control unit 100 goes to step 216 to check whether the user ends the storing operation or the condition set by the user to end the storing operation is met. If the user does not end the storing operation, or the condition to end is not met, the control unit 100 goes to step 218 to select the next data frame subsequently received after completing the storing of the presently selected data frame. The control unit 100 returns to step 212 to add the frame interval retrieved from the frame interval storage 130 to the present TS value retrieved from the TS storage 126 so as to store again the added value in the TS storage 126. Accordingly, the digital broadcast data frames received just after resuming the strong electric field strength are stored so as to have the TS values immediately and sequentially following the TS value of the data frame received just before entering the weak electric field strength region.

After restarting the storing process of the data frames, the digital broadcast terminal may enter a weak electric field strength region. In this case, the control unit returns to step 206 to stop the storing operation, repeating steps 208 to 218. In this case, the storing process may also be stopped in step 206 if the weak electric field strength has lasted over the threshold time. As a result, the invention enables the digital broadcast receiving terminal to continuously and smoothly play back the data frames received in the strong electric field strength region even if the terminal has passed through the weak electric field strength region once or more than once.

Figure 3:
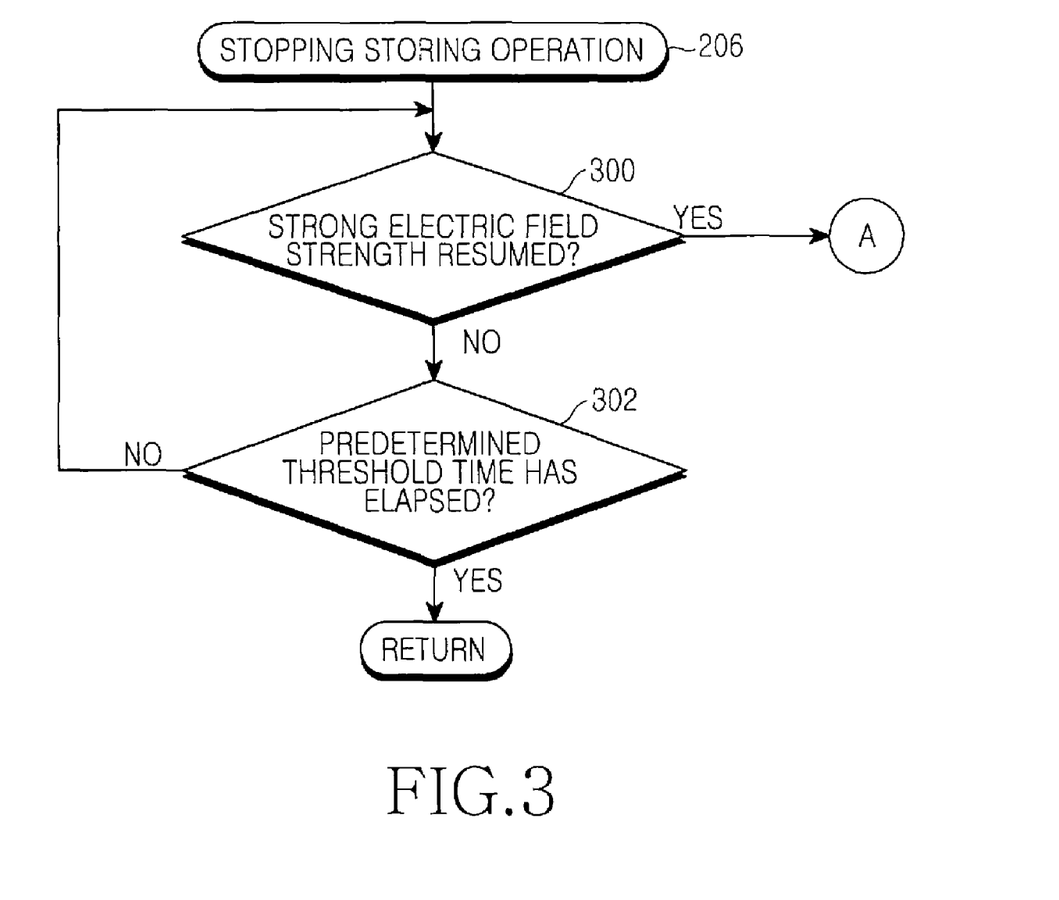
FIG. 3 is a flowchart for illustrating a process of stopping the storing operation of the data frames if there has been set a threshold time for detecting weak electric field strength interval according to an embodiment of the present invention.

In FIG. 3 for illustrating the process of stopping the storing process, if there has been set a predetermined threshold time for determining whether the digital broadcast receiving terminal has entered a weak electric field strength region, the control unit 100 goes to step 300 to detect the resumption of a strong electric field strength after storing, in step 204, the TS value of the data framed received just before entering the weak electric field strength region. With the strong electric field strength detection having resumed, the control unit 100 returns to step 202 to check whether the digital broadcast receiving terminal has entered a weak electric field strength region without stopping the process of storing the presently broadcast data frames.

However, with the strong electric field strength detection not having resumed in step 300, the control unit 100 goes to step 302 to check whether the predetermined threshold time has elapsed. If the threshold time has not elapsed in step 302, the control unit 100 returns to step 300 to determine whether the digital broadcast receiving terminal has entered a strong electric field strength region. If the threshold time has elapsed in step 302 without resuming the strong electric field strength, the control unit 100 goes to step 206 to stop the operation of storing the broadcast digital data frames. Thus, the predetermined threshold time serves as a reference time to determine whether the terminal has definitely entered a weak electric field strength region or not. If the threshold time has not elapsed until the terminal passes the weak electric field strength region, the control unit 100 judges it as a temporary phenomenon so as to keep on storing the broadcast digital data frames.

Figure 4:
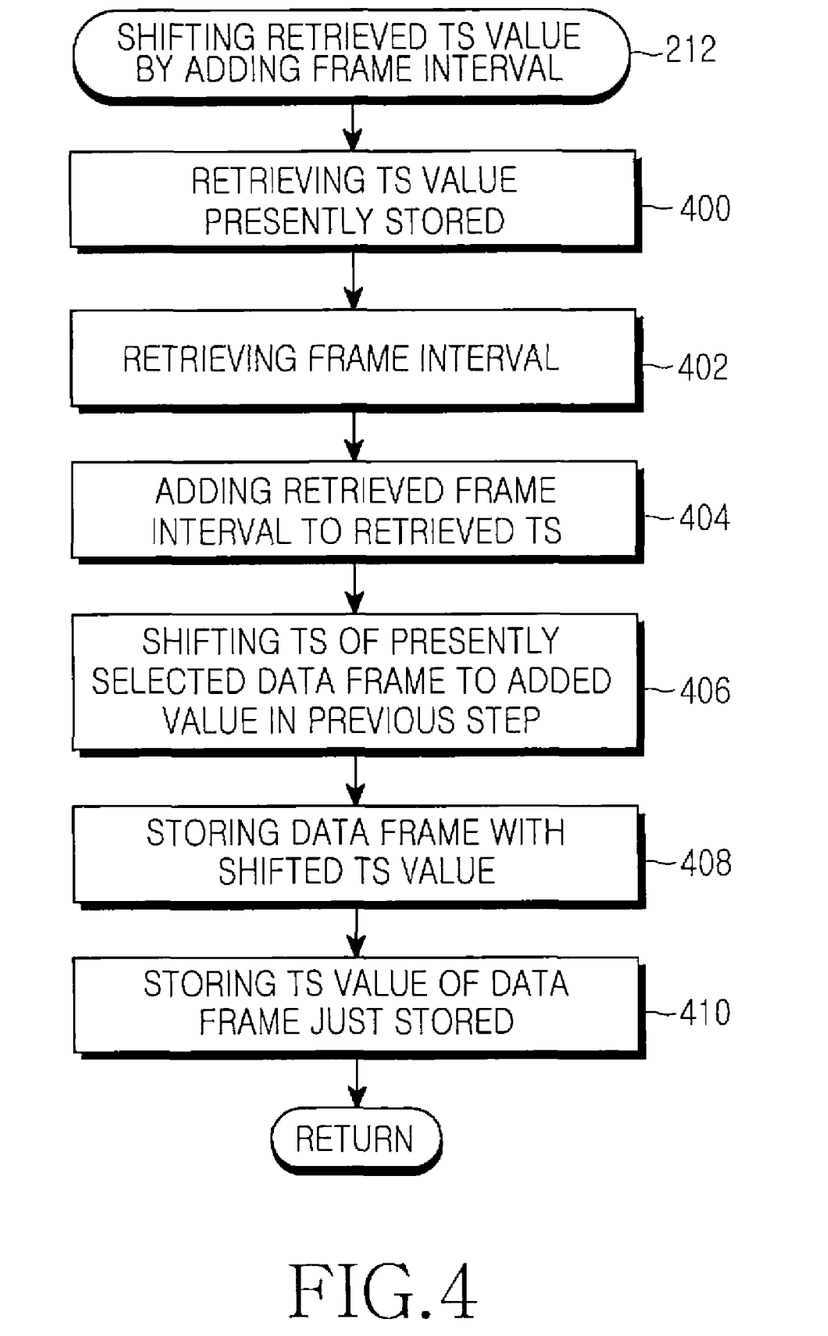
FIG. 4 is a flowchart for illustrating a process of shifting the TS value according to an embodiment of the present invention.

In FIG. 4 for showing the process of shifting the TS value, if selecting in step 210 or 218 the data frame received just after resuming the strong electric field strength, the control unit goes to step 400 to retrieve the TS value from the TS storage 126 of the memory part 102. Then, the control unit 100 goes to step 402 to retrieve the predetermined frame interval, and then goes to step 404 to add the frame interval to the TS value. Subsequently, the control unit 100 goes to step 406 to shift the TS value of the presently selected digital broadcast data frame to the added value obtained in step 404. The control unit 100 then goes to step 408 to store the data frame with the shifted TS value. In step 410, the control unit 100 goes to store the TS value of the just stored data frame in the TS storage 126. Thus, the digital broadcast data frames received just after resuming detection of the strong electric field strength are stored so as to have the TS values immediately and sequentially following the TS value of the data frame received just before entering the weak electric field strength region, so that the digital broadcast receiving terminal may continuously and smoothly play back the data frames received in the strong electric field strength region.

Figure 5:
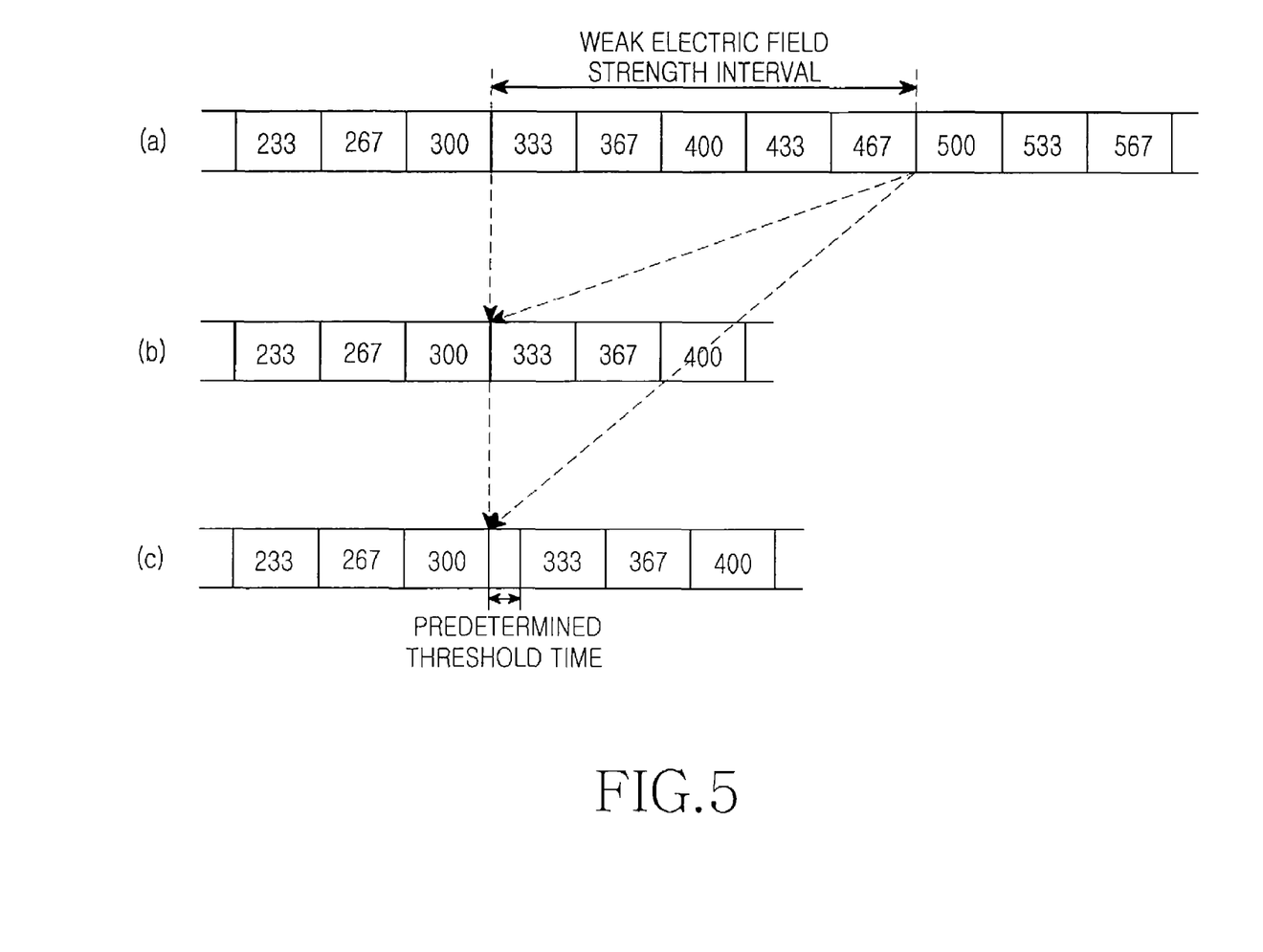
FIG. 5 is an example illustrating the storage of audio/visual frames according to an embodiment of the present invention.

FIGS. 5A to 5C, respectively, show the flow of the digital broadcast data generated from a digital broadcast station, whereby the digital broadcast data is received with and without a predetermined threshold time according to the invention.

In FIGS. 5A to 5C, the digital broadcast receiving terminal is in a weak electric field strength region during the broadcasting interval from the leading end of the data frame with the TS value of 300 to the leading end of the data frame with the TS value of 467, and the frame interval as 33 msec, namely 30 frames per second.

In FIG. 5B, if the digital broadcast receiving terminal enters a weak electric field strength region, the control unit 100 stops the operation of storing the data frames, then stores the TS value 300 of the data frame stored just before entering the weak electric field strength region in the TS storage 126, and checks whether the digital broadcast receiving terminal re-enters a strong electric field strength region. If the terminal has re-entered a strong electric field strength region, the control unit 100 determines whether the reception of the data frame with the TS value 500 following the data frame with the TS value 467 has been completed. The reception of the data frame with the TS value 500 having been completed, the control unit 100 shifts the TS value 500 to the value 333 obtained by adding the frame interval 33 to the TS value 300 presently stored in the TS storage 126, then storing the data frame with the shifted TS value 333 in the frame storage 132 of the memory part 102. The control unit 100 also stores the TS value 333 of the just stored data frame in the TS storage 126. This process is repeated to store the digital broadcast data frame-by-frame until it is terminated. Thus, the data frames received after entering the strong electric field strength region are stored so as to have shifted TS values in the memory part 102, as shown in FIG. 5B.

FIG. 5C shows the process of storing the data frames with the predetermined threshold time as described above. In this case, if the digital broadcast receiving terminal enters a weak electric field strength region, the control unit 100 does not stop the operation of storing the data frames until the threshold time has elapsed, compared to FIG. 5B. Namely, it stops the storing process only when the threshold time has elapsed. If the storing process resumes while in the strong electric field strength region, it also stores the received data frames with shifted TS values in the frame storage 132 of the memory part 102, as described in connection with FIG. 5B. Moreover, even if the digital broadcast receiving terminal resumes the storing process while in the strong electric field strength region within the threshold time, and so faulty audio/visual signals are stored during the threshold time, the use of the threshold time is advantageous in that an insignificantly temporary phenomenon of storing process while in weak electric field strength region is ignored so as to continuously and smoothly play back the data frames received without frequently stopping the storing process.

In another embodiment, the invention may be applied to all cases involving the storing of the digital broadcast data using the TS value. For example, the present invention may be applied to terrestrial DMB (Digital Multimedia Broadcasting) using CTS (Composition Time Stamp) and satellite DMB using PTS (Presentation Time Stamp). Likewise, the present invention may also be applied to all kinds of DMB using TS.

While the invention has been shown and described with reference to a certain preferred embodiment thereof, it will be understood by those skilled in the art that various changes in form and details may be made therein without departing from the spirit and scope of the invention.

What is claimed is:

1. An apparatus for storing digital broadcast data in a digital broadcast receiving terminal, comprising:
a receiving state sensor for sensing the receiving state of the digital broadcast data;
a digital broadcast receiver for receiving the digital broadcast data frame-by-frame;
a memory part for storing at least one frame of the digital broadcast data, a first TS (Time Stamp) value of a data frame stored immediately prior to entering a weak electric field strength region, and a frame interval of the digital broadcast data;
a TS extractor for extracting a first TS value of the data frame;
a TS shifter for adding the frame interval to the first TS value of the data frame; and
a control unit for dropping the digital broadcast data received in the weak electric field strength region when the digital broadcast receiving terminal enters the weak electric field strength region, determining whether the digital broadcast receiving terminal re-enters a strong electric field strength region, shifting a second TS value of a data frame received after entering the strong electric field strength region to a value obtained by adding the frame interval to the first TS value of the data frame so as to play back the data frames received during the strong electric field strength region continuously, and resuming the storing process when the digital broadcast receiving terminal enters the strong electric field strength region.

2. The apparatus of claim 1, wherein the control unit sets a threshold time so that only when the digital broadcast receiving terminal does not re-enter the strong electric field strength region within the threshold time, indicating that the digital broadcast receiving terminal is in the weak electric field strength region.

3. The apparatus of claim 2, wherein the control unit enables a user to adjust the threshold time.

4. The apparatus of claim 1, wherein the digital broadcast receiving terminal includes a TS extractor.

5. The apparatus of claim 1, wherein receiving state sensor determines the receiving state of the digital broadcast data, by means of at least one received signal strength detection method and signal-to-noise ratio method, the signal strength detection method determines whether the digital broadcast receiving terminal is in the strong or the weak electric field strength region by comparing the signal strength of the received digital broadcast data with a threshold value, and signal-to-noise detection method determines whether the digital broadcast receiving terminal is in the strong or the weak electric field strength region by comparing the signal-to-noise ratio of the received digital broadcast data with a threshold value.

6. The apparatus of claim 1, wherein the receiving state sensor determines whether the digital broadcast receiving terminal is in the strong or the weak electric field strength region by comparing the signal-to-noise ratio of the received digital broadcast data with a threshold value if the signal strength of the received digital broadcast data exceeds a threshold value.

7. The apparatus of claim 1, wherein, if detecting the completion of storing a current data frame, the control unit selects the next data frame subsequent to the current data frame.

8. The apparatus of claim 1, wherein the TS value includes at least one of a Composition Time Stamp (CTS) and a Presentation Time Stamp (PTS).

9. A method for storing digital broadcast data, comprising the steps of:
   storing received digital broadcast data frame-by-frame;
   determining whether a current receiving state of the digital broadcast data indicates a weak electric field strength;
   storing a TS value of the data frame currently having been stored as the TS value of the data frame if the current receiving state indicates the weak electric field strength;
   dropping the digital broadcast data received in a the weak electric field strength region when the current receiving state indicates the weak electric field strength;
   determining whether the current receiving state of the digital broadcast data recovers a strong electric field strength;
   selecting the data frame having been received just when the current receiving state has recovered the strong electric field strength;
   shifting the TS value of the selected data frame to a value obtained by adding a frame interval to the TS value of the data;
   restarting the storing of the data frame with a shifted TS value; and
   replacing the TS value of the frame with the shifted TS value of the stored data frame.

10. The method of claim 9, wherein selecting the data frame further comprises the steps of:
    selecting the data frame having been received just after the receiving state has recovered strong electric field strength;
    detecting the completion of storing the selected data frame;
    selecting again the next data frame just after the previous selected data frame has been completely stored.

11. The method of claim 9, wherein drooping the digital broadcast data further comprises the steps of:
    checking whether the receiving state has recovered the strong electric field strength in a threshold time; and
    stopping the storing process of the digital broadcast data if the receiving state has not yet recovered the strong electric field strength.

12. The method of claim 9, wherein shifting the TS value further comprises the steps of:
    retrieving the TS value of the data frame and the frame interval;
    adding the frame interval to the TS value of the data frame; and
    shifting the TS value of the currently selected data frame to the result of the previous addition.

13. The method of claim 9, wherein the TS value includes at least one of a Composition Time Stamp (CTS) and a Presentation Time Stamp (PTS).

* * * * *